July 2, 1929.  E. M. SCOVILLE  1,718,985
GREASE CHARGING APPARATUS
Filed May 5, 1927

Inventor
E. M. Scoville
by W. H. Lieber
Attorney

Patented July 2, 1929.

1,718,985

UNITED STATES PATENT OFFICE.

EUGENE M. SCOVILLE, OF CINCINNATI, OHIO, ASSIGNOR OF ONE-HALF TO FLOYD L. SWANBERG, OF PITTSBURGH, PENNSYLVANIA.

GREASE-CHARGING APPARATUS.

Application filed May 5, 1927. Serial No. 188,948.

The present invention relates in general to various improvements in the construction and operation of apparatus for charging or supplying a receptacle with semi-fluent substances such as grease.

An object of the invention is to provide an improved grease charging device or the like, which is extremely simple and compact in construction, and which may be conveniently manipulated. Another object of the invention is to provide new and useful grease charging or pumping apparatus which will effectively prevent the entry of air or dirt to the grease receiving chambers and passages, and all elements of which may be readily manufactured, assembled or dismantled. These and other objects and advantages of the improved structure will be apparent from the following description.

A clear conception of an embodiment of the invention and of the mode of constructing, assembling dismantling and of manipulating devices manufactured in accordance therewith, may be had by referring to the drawing accompanying and forming a part of this specification in which like reference characters designate the same or similar parts in the several views.

Figure 1:
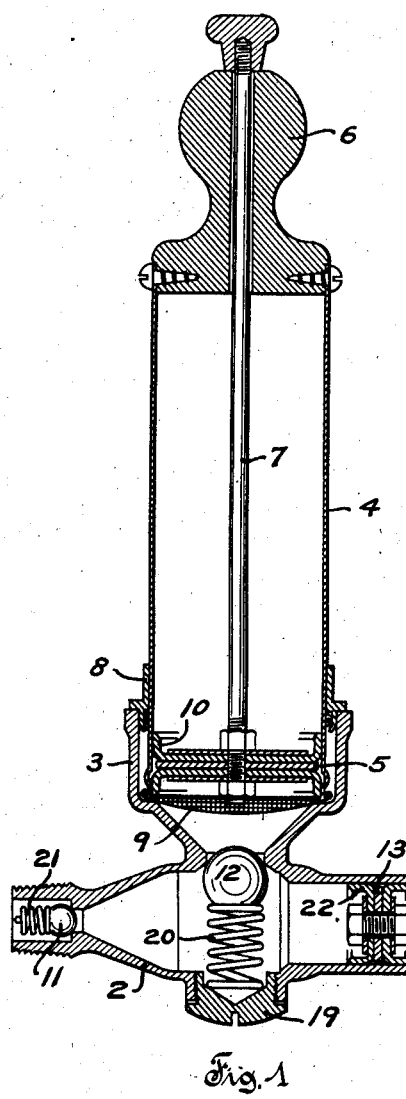
Fig. 1 is a central vertical section through a completely assembled grease charging device.
Figure 2:
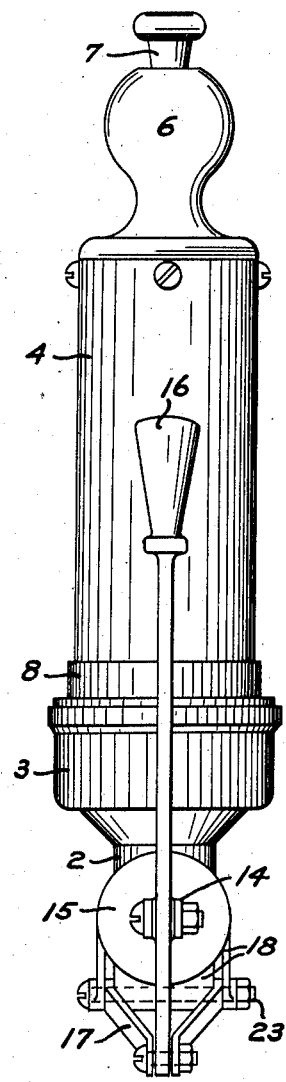
Fig. 2 is a side elevation of the improved grease charging device.
Figure 3:
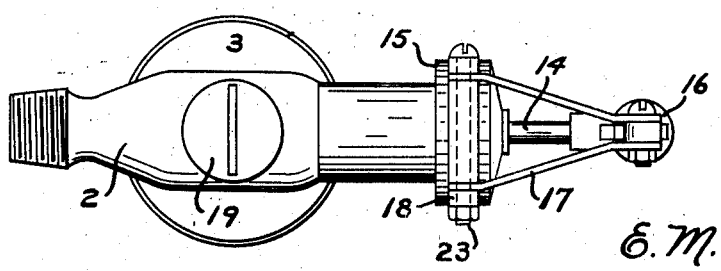
Fig. 3 is a bottom view of the improved grease charging device.

By referring to the drawing, it will be noted that the specific embodiment of the invention disclosed therein, comprises in general a main body or casing 2 having a bore and a socket 3 extending laterally of the bore; a cylindrical magazine 4 detachably associable with the main casing socket 3; and a piston 13 within and movable longitudinally of the casing bore by means of an actuating lever 16. A removable fine screen or strainer 9 is snugly fitted within the socket 3, and a ball suction valve 12 is located within the casing 2 between the bore and the strainer, and is normally urged against its seat by means of a helical spring 20 which reacts against a removable plug 19 associated with the casing 2 on the opposite side of the bore from the suction valve seating. It will be apparent that the valve 12 and the spring 20 are readily removable upon removal of the plug 19, and that the section valve seat may be conveniently machined through the opening which is normally closed by the plug 19. A ball discharge valve 11 is located within the delivery end of the casing 2 in line with the bore, and is normally urged against its seat by means of a helical spring 21 which reacts against a removable transverse pin passing through alined holes in the threaded end of the casing. The valve 11 and spring 21 are readily removable upon withdrawal of the transverse retaining pin, and the discharge valve seat may be conveniently machined from the end of the casing 2.

One end of the cylindrical magazine 4 is open, and the opposite end thereof is substantially inclosed by means of a handle 6. A plunger 5 having opposed cup leather packings 10 is slidable within the cylindrical wall of the magazine 4 by means of a plunger rod 7 which penetrates the handle 6 and is provided with a manipulating knob at its upper end. The outer surface of the cylindrical wall of the magazine 4 is slidably engaged by a sealing ring 8 which is adapted to fit snugly within the socket 3 and to have screw thread engagement therewith if desired, in order to pack the joint between the casing 2 and the magazine 4. The lower end of the magazine 4 may be beaded as shown in order to prevent the sealing ring 8 from dropping off.

The end of the main casing 3 adjacent to the bore and remote from the discharge valve 11, is provided with a removable cap 15 having a peripheral annular recess therein. A swivel element or bracket 18 is rotatably associated with the cap 15 within the recess and is retained in position by means of a pivot pin 23. A pair of links 17 have their corresponding ends pivotally associated with the pivot pin 23 and have their opposite corresponding ends pivotally associated with an end of the lever 16. The medial portion of the lever 16 is pivotally associated with an end of the piston rod 14 which penetrates the cap 15 and has its opposite end detachably connected to the piston 13. The piston 13 is provided with opposed cup leather packings 22 slidable along the bore of the casing 2 and rotatable therein when it is desired to angularly adjust the manipulating lever 16 about the axis of the rod 14.

In order to charge the magazine 4 with grease or the like, it is necessary to remove the beaded end of the magazine 4 together with the sealing ring 8 from the socket 3, and to move the plunger 5 as near as possible toward the open end of the magazine, as shown in Fig. 1. The open end of the magazine 4 should then be inserted in a supply of grease, and the plunger 5 withdrawn with the aid of the plunger rod 7. When the plunger 5 is thus withdrawn, the grease is drawn by suction through the open end and into the cylindrical magazine casing, and completely fills the space below the plunger 5.

After the magazine 4 has been completely filled with grease, the beaded end thereof may again be inserted in the socket 3 and the sealing ring 8 may be moved along the outer surface and subsequently applied to the socket end, thereby thoroughly wiping the grease from the outer surface of the magazine into the socket 3. When the magazine 4 has been thus properly charged and carefully applied to the socket 3, the delivery end of the casing 2 may be applied to the receiving reservoir which is to be supplied with grease, whereupon the lever 16 may be oscillated to reciprocate the piston 13. As the piston 13 is moved away from the discharge valve 11, this valve remains closed, but the suction valve 12 opens and grease flows from the magazine 4 through the strainer 9 and past the valve 12 into the casing 2 by virtue of the atmospheric pressure acting upon the exposed face of the plunger 5 and forcing this plunger toward the strainer 9. When the piston 13 is moved in the opposite direction, the suction valve 12 is closed and the grease confined within the casing 2 is forced past the discharge valve 11 into the receiving reservoir. Continued oscillation of the lever 16 will cause the grease to be delivered from the magazine 4 through the casing 2 in the manner described, until the magazine is empty as indicated by engagement of the knob at the end of the plunger rod 7 with the handle 6.

The sealing ring 8 and cup leather packings 10, 13, positively prevent entry of air to the grease confining chambers and passages, and the strainer 9 prevents entry of dirt through the valve 12 with the grease. The swivel mounting of the manipulating lever 16, enables convenient operation thereof from any desired angle, and the plunger rod 7 permits convenient operation of the plunger 5. If desired, the rod 7 and plunger 5 may also be utilized to force grease directly and continuously from the magazine past the valves 12, 11 and through the casing 2, in case the resistance is not too great.

It will be apparent that the various elements of the structure may be readily manufactured and assembled. The valve seats are freely accessible for machining, and the valves 11, 12 and the springs 21, 20 may be readily inserted and removed. The cup leather packings 10, 22 may be quickly renewed when necessary, and the lever 16, links 17, bracket 18, cap 15, piston 13 and rod 14 may be removed from the casing 2 without dismantling these elements. The mechanism besides being extremely simple and compact in construction, presents a neat and mechanical appearance and is exceedingly efficient in operation.

It should be understood that it is not desired to limit the invention to the exact details of construction and operation herein shown and described, for various modifications within the scope of the claims may occur to persons skilled in the art.

It is claimed and desired to secure by Letters Patent:—

1. In combination, a casing having a bore and a socket extending laterally of said bore, a magazine detachably associable with said casing at said socket, a suction valve disposed centrally of said magazine on one side of said bore adjacent to said socket, removable means disposed centrally of said magazine on the opposite side of said bore for effecting access to said valve, and a piston movable within said bore to withdraw fluent material from said magazine past said valve.

2. In combination, a casing having a bore and a circular socket disposed closely adjacent to and extending laterally of said bore, a magazine detachably associable with said casing at said socket, a suction valve disposed centrally of and adjacent to said socket on one side of said bore, a removable plug disposed centrally of said socket on the opposite side of said bore for effecting access to said valve, and a piston movable within said bore to withdraw fluent material from said magazine past said valve.

3. In combination, a casing having a bore and a circular socket disposed closely adjacent to and extending laterally of said bore, a magazine detachably associable with said casing at said socket, a ball suction valve within said casing centrally of and adjacent to said socket and on one side of said bore, a removable plug secured to said casing centrally of said socket and on the opposite side of said bore for effecting access to said valve, a spring reacting against said valve and said plug, and a piston movable within said bore to withdraw fluent material from said magazine past said valve.

4. In combination, a casing having a bore, a one-piece cap detachably associated with said casing at an end of said bore, said cap having an annular peripheral recess, a bifurcated bracket rotatably confined within said recess, a piston slidable within said bore and having a rod penetrating said cap, a lever pivotally associated at its medial portion with the end of said rod, links connecting an end of said lever with the ends of the bifurcations of said bracket, and a pin pivotally connecting said links and said bracket, said pin also serving to lock said bracket within said recess.

In testimony whereof, the signature of the inventor is affixed hereto.

EUGENE M. SCOVILLE.